United States Patent
Gan et al.

(10) Patent No.: US 9,766,004 B2
(45) Date of Patent: Sep. 19, 2017

(54) ENHANCED ECONOMY REFRIGERATION CONTROL SYSTEM

(75) Inventors: Mason Gan, Manlius, NY (US); Yu H. Chen, Manlius, NY (US); David V. Soergel, Jamesville, NY (US)

(73) Assignee: CARRIER CORPORATION, Farmington, CT (US)

( * ) Notice: Subject to any disclaimer, the term of this patent is extended or adjusted under 35 U.S.C. 154(b) by 785 days.

(21) Appl. No.: 14/114,245

(22) PCT Filed: Apr. 5, 2012

(86) PCT No.: PCT/US2012/032259
§ 371 (c)(1),
(2), (4) Date: Oct. 28, 2013

(87) PCT Pub. No.: WO2013/106018
PCT Pub. Date: Jul. 18, 2013

(65) Prior Publication Data
US 2014/0041399 A1 Feb. 13, 2014

Related U.S. Application Data

(60) Provisional application No. 61/480,754, filed on Apr. 29, 2011.

(51) Int. Cl.
*F25D 17/00* (2006.01)
*F25B 49/02* (2006.01)
*F25D 29/00* (2006.01)

(52) U.S. Cl.
CPC .............. *F25B 49/02* (2013.01); *F25D 29/00* (2013.01); *F25B 2600/0251* (2013.01);
(Continued)

(58) Field of Classification Search
CPC ................ F25B 49/02; F25B 2600/112; F25B 2600/0251; F25D 29/00; F25D 2700/12
See application file for complete search history.

(56) References Cited

U.S. PATENT DOCUMENTS 4,663,725 A * 5/1987 Truckenbrod ..... B60H 1/00014
165/255
4,909,041 A 3/1990 Jones
(Continued)

FOREIGN PATENT DOCUMENTS

EP 1564514 A1 8/2005
JP 2003097858 A 4/2003
(Continued)

OTHER PUBLICATIONS

PCT International Preliminary Report on Patentability and Written Opinion of the International Searching Authority for International Application No. PCT/US2012/032259, Nov. 7, 2013, 9 pages.
(Continued)

*Primary Examiner* — Larry Furdge
(74) *Attorney, Agent, or Firm* — Cantor Colburn LLP

(57) ABSTRACT

A controller for controlling a refrigeration unit, a method, and a refrigeration system are disclosed. In an illustrative embodiment, a controller stores instructions for a first refrigeration setting and a second refrigeration setting, tracks a cumulative average temperature in a refrigeration element, and activates either the first refrigeration setting or the second refrigeration setting. The first refrigeration setting has a lower average power consumption and a higher range of temperature variation than the second refrigeration setting. The controller activates the first refrigeration setting until the cumulative average temperature goes outside a selected temperature range; then the controller activates the second refrigeration setting until the cumulative average temperature is within a target temperature range that has a lower threshold that is greater than the lower threshold of the selected temperature range and an upper threshold that is less than the upper threshold of the selected temperature range.

25 Claims, 5 Drawing Sheets

(52) U.S. Cl.
CPC ..... *F25B 2600/112* (2013.01); *F25D 2700/12* (2013.01); *Y02B 30/743* (2013.01)

(56) References Cited

U.S. PATENT DOCUMENTS

| | | | |
|---|---|---|---|
| 4,949,548 A * | 8/1990 | Meyer | F25B 49/00 62/180 |
| 4,967,568 A | 11/1990 | Harnden, Jr. et al. | |
| 5,163,301 A | 11/1992 | Cahill-O'Brien et al. | |
| 5,255,530 A * | 10/1993 | Janke | F25B 49/025 62/180 |
| 5,530,647 A | 6/1996 | Sem et al. | |
| 5,531,264 A * | 7/1996 | Eike | B60H 1/00014 165/42 |
| 5,579,648 A | 12/1996 | Hanson et al. | |
| 5,829,674 A | 11/1998 | Vanostrand et al. | |
| 6,591,622 B1 * | 7/2003 | Gherman | F25D 29/00 165/265 |
| 6,619,061 B2 | 9/2003 | Beaverson et al. | |
| 6,626,002 B1 | 9/2003 | Notohara et al. | |
| 7,475,556 B2 | 1/2009 | Arno | |
| 7,666,664 B2 | 2/2010 | Sarofim et al. | |
| 2004/0050075 A1 | 3/2004 | King et al. | |
| 2006/0042296 A1 | 3/2006 | Ludwig et al. | |
| 2008/0289354 A1 | 11/2008 | Dudley et al. | |
| 2009/0025410 A1 * | 1/2009 | Tanaka | F25B 41/043 62/228.1 |

FOREIGN PATENT DOCUMENTS

| | | |
|---|---|---|
| JP | 2005331140 A | 12/2005 |
| JP | 2007107815 A | 4/2007 |

OTHER PUBLICATIONS

PCT International Search Report and Written Opinion of the International Searching Author for International Application No. PCT-US2012/032259, Aug. 16, 2013, 13 pages.

Singapore Written Opinion and Search Report for application SG 2013079702, dated Dec. 23, 2014, 14 pages.

* cited by examiner

ENHANCED ECONOMY REFRIGERATION CONTROL SYSTEM

CROSS-REFERENCE TO RELATED APPLICATION

Reference is made to and this application claims priority from and the benefit of U.S. Provisional Application Ser. No. 61/480,754, filed Apr. 29, 2011, and entitled ENHANCED ECONOMY REFRIGERATION CONTROL SYSTEM, which application is incorporated herein in its entirety by reference.

FIELD OF THE INVENTION

This invention relates generally to transport refrigeration systems and, more particularly, to control systems for transport refrigeration systems.

BACKGROUND OF THE INVENTION

Transport refrigeration systems are commonly used to transport perishable cargo, such as, for example, produce, dairy products, cut flowers, and frozen products, such as meat, poultry, and fish. Transport refrigeration systems may include refrigerated trailers, trucks, containers, and railroad cars, for example. In the case of refrigerated trucks, a transport refrigeration system may typically be mounted to the truck, typically behind the truck or on the roof of the truck for maintaining a controlled temperature environment within the cargo space within the truck. In the case of refrigerated trailers, which are typically pulled behind a tractor cab, a transport refrigeration system may typically be mounted to the trailer, typically to the front wall of the trailer for maintaining a controlled temperature environment within the cargo space within the trailer. In the case of refrigerated containers, a transport refrigeration system may typically be mounted to one end of a container box.

Conventionally, transport refrigeration systems used in connection with refrigerated trucks and refrigerated trailers and refrigerated containers include a transport refrigeration unit having a refrigerant compressor, a condenser comprising a condenser coil with one or more associated condenser fans, an expansion device, and an evaporator comprising an evaporator coil with one or more associated evaporator fans, which are connected via appropriate refrigerant lines in a closed refrigerant flow circuit. The compressor and other components may typically be powered by a diesel engine and/or an electric motor. Air or an air/gas mixture or other gas is drawn from the interior volume of the trailer by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

In conventional practice, a transport refrigeration unit installed on a refrigerated truck or trailer may operate in different control modes, such as a temperature pulldown mode, a temperature control mode, or an idle mode. In a typical temperature pulldown mode, the refrigerant compressor, the condenser fan(s) and the evaporator fan(s) are operating with the refrigerant compressor generally operating at full capacity to lower the temperature within the cargo space to a desired set point temperature appropriate for the particular cargo stowed in the cargo space. In a typical temperature control mode, the refrigerant compressor, the condenser fan(s) and the evaporator fan(s) are still operating, but the refrigerant compressor may be operating at a significantly lower capacity so as to maintain the temperature in the cargo space within a specified range of the desired set point temperature and avoid over cooling. In the temperature control mode, heaters associated with the evaporator may also be activated as necessary to warm the air passed through the evaporators by the evaporator fan(s) to prevent over cooling. In the idle mode, the refrigerant compressor and the condenser and evaporator fans are off.

There has been ongoing interest in more advanced control modes to provide for more complex temperature control purposes. For example, U.S. Pat. No. 5,163,301 discloses a refrigeration system control with an illustrative object to provide an improved means for controlling the temperature of chilled air delivered to a refrigerated container unit when operating under light load conditions. As another example, U.S. patent application publication number 2008/0289354 discloses a method for creating multiple refrigerated compartment spaces having precision temperature control, which includes prioritizing the compartments by identifying at least one priority compartment to be held at a setpoint temperature, and limiting refrigerant flow to all but the priority compartment when there is insufficient cooling capacity to maintain all compartments at their respective setpoint temperatures. Additionally, there has been significant interest in providing for economy modes that manage the energy expenditure of transport refrigeration units.

The discussion above is merely provided for general background information and is not intended to be used as an aid in determining the scope of the claimed subject matter.

SUMMARY OF THE INVENTION

A controller for controlling a refrigeration unit, a method, and a refrigeration system are disclosed. In an illustrative embodiment, a controller is configured for storing instructions for a first refrigeration setting, storing instructions for a second refrigeration setting, tracking a cumulative average temperature in a refrigeration element, and activating either the first refrigeration setting or the second refrigeration setting. The first refrigeration setting has a first average power consumption and a first range of temperature variation, and the second refrigeration setting has a second average power consumption and a second range of temperature variation, wherein the first average power consumption is lower than the second average power consumption, and the second range of temperature variation is smaller than the first range of temperature variation. The controller activates the first refrigeration setting while the cumulative average temperature is within a selected temperature range having a lower threshold and an upper threshold, and once the cumulative average temperature is less than the lower threshold or greater than the upper threshold of the selected temperature range, the controller activates the second refrigeration setting until the cumulative average temperature is within a target temperature range that has a lower threshold that is greater than the lower threshold of the selected temperature range and an upper threshold that is lower than the upper threshold of the selected temperature range.

In another illustrative embodiment, a method includes providing a first refrigeration control mode and a second refrigeration control mode for operating a refrigeration unit, operating the refrigeration unit in the first refrigeration control mode; monitoring a cumulative average temperature in the refrigeration element since beginning operating the refrigeration unit in the first refrigeration control mode, and once the cumulative average temperature in the refrigeration element is outside a selected temperature range, switching to operating the refrigeration unit in the second refrigeration control mode. An average power consumption in the first refrigeration control mode is lower than an average power consumption in the second refrigeration control mode, and the second refrigeration control mode maintains the refrigeration unit within a smaller range of temperature variation than the first refrigeration control mode. The refrigeration unit is operated in the second refrigeration control mode until the cumulative average temperature in the refrigeration element is within a target temperature range around a setpoint temperature. The target temperature range has an upper limit that is lower than an upper limit of the selected temperature range, and a lower limit that is higher than a lower limit of the selected temperature range.

In another illustrative embodiment, a refrigeration system includes a refrigeration unit, a refrigerated air supply, and a controller. The refrigeration unit includes a compressor, a condenser comprising one or more condenser fans, an expansion device, and an evaporator comprising one or more evaporator fans. The refrigerated air supply leads from the evaporator to a refrigeration chamber. The controller has a communicative link to the compressor, the one or more condenser fans, and the one or more evaporator fans. The controller is configured to operate the refrigeration unit alternately in a first mode and a second mode, track a cumulative average temperature in the refrigerated air supply, and once the cumulative average temperature is outside a selected temperature range, switches the refrigeration unit from operating in the first mode to the second mode. The first mode has a lower average power consumption than the second mode, and the second mode maintains the refrigeration unit within a smaller range of temperature variation than the first mode. The refrigeration unit is switched from operating in the first mode to the second mode until the cumulative average temperature is within a target temperature range around a setpoint temperature. The target temperature range has an upper limit that is lower than an upper limit of the selected temperature range, and a lower limit that is higher than a lower limit of the selected temperature range.

In another illustrative embodiment, a controller is disclosed for controlling a refrigeration unit that includes an evaporator having at least one evaporator fan. The controller is configured for alternately activating a first phase and a second phase in the refrigeration unit, wherein the controller activates the first phase when an upper temperature threshold is detected in the refrigeration element, and the controller activates the second phase when a lower temperature threshold is detected in the refrigeration element. The at least one evaporator fan is activated during a majority of each of the first phase and the second phase, and the at least one evaporator fan is inactivated an interval of time prior to the end of each of the first phase and the second phase.

This Summary is intended only to provide a brief overview of subject matter disclosed herein according to one or more illustrative embodiments, and does not serve as a guide to interpreting the claims or to define or limit the scope of the invention, which is defined only by the appended claims. This Summary is provided to introduce an illustrative selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

For a further understanding of the invention, reference will be made to the following detailed description of the invention which is to be read in connection with the accompanying drawing, where.

The drawings are not necessarily to scale and do not necessarily include all relevant features or elements, emphasis instead generally being placed upon illustrating the principles of various embodiments. In the drawings, like numerals are used to indicate like parts throughout the various views.

DETAILED DESCRIPTION OF THE INVENTION

Figure 1:
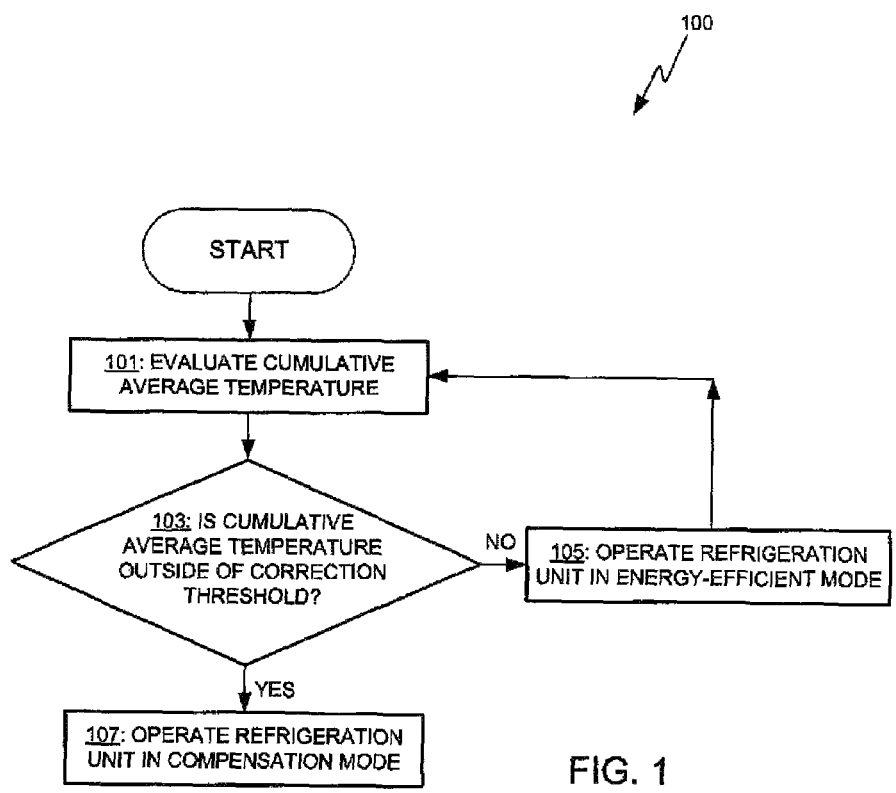
FIG. 1 depicts a flowchart for a method according to one illustrative embodiment.
Figure 2:
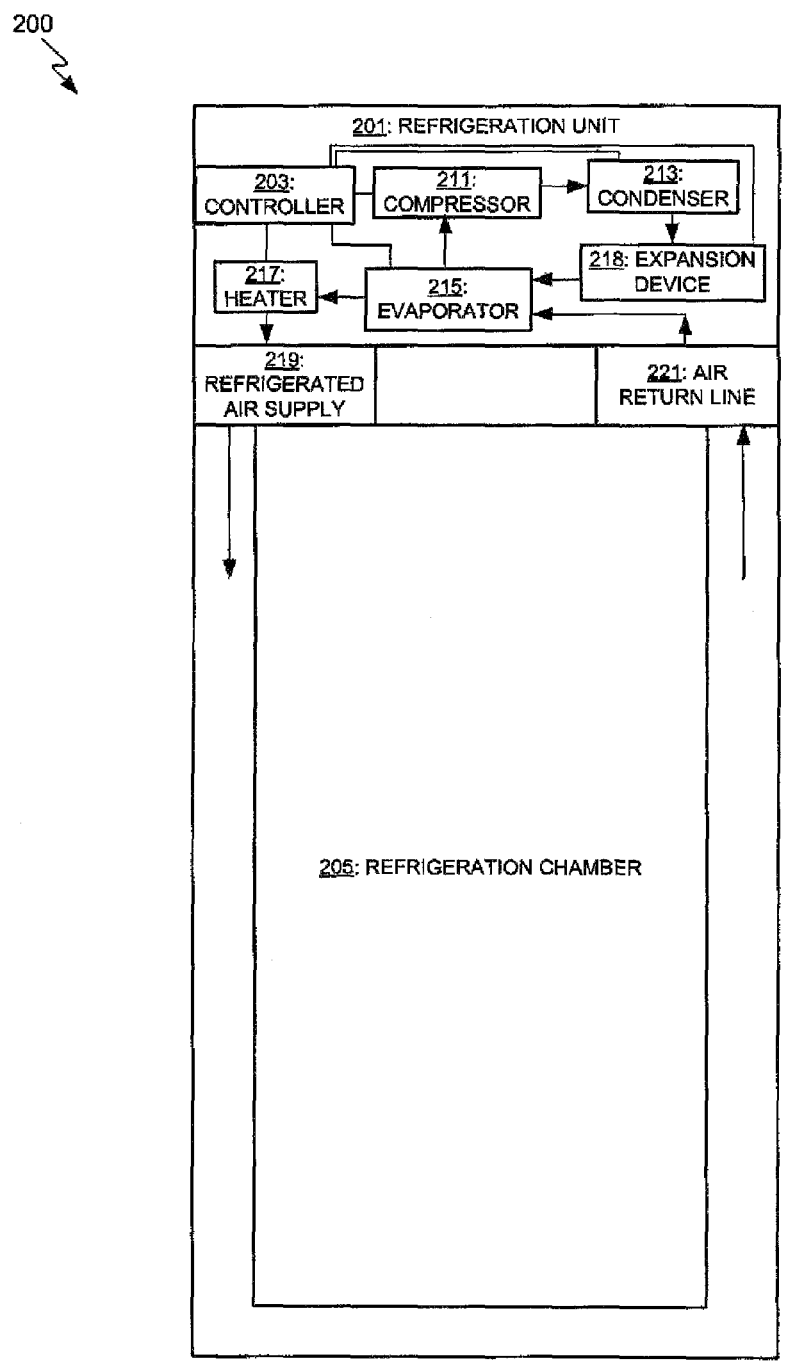
FIG. 2 depicts a schematic block diagram of a refrigeration system according to one illustrative embodiment.

Referring initially to FIGS. 1 and 2, there are depicted exemplary embodiments of a refrigeration system 200 having a refrigeration unit 201, and a method 100 for operating the refrigeration unit 201. Method 100 may illustratively be executed by controller 203, for example. Any of controller 203, executable instructions processed by controller 203, method 100, and other aspects of this system may be considered a control system for controlling refrigeration unit 201, in various embodiments.

Refrigeration system 200 in this illustrative embodiment is in the form of a refrigerated cargo container and includes refrigeration unit 201 and refrigeration chamber 205. Refrigeration unit 201 includes controller 203, a compressor 211, a condenser 213, an expansion device 218, an evaporator 215, a heater 217, and a refrigerated air supply 219 leading from the evaporator 215 to a refrigeration chamber 205, in this illustrative embodiment. Controller 203 may have a communicative link to the compressor 211, the condenser 213, the evaporator 215, the heater 217, and the expansion device 218, in this illustrative embodiment. Controller 203 is depicted in FIG. 2 with schematic lines to these components representing communication lines, though these may include any type of hard-line or wireless communication devices and protocols in different embodiments. Condenser 213 may include a condenser coil with one or more associated condenser fans. Condenser 213 may be activated by activating one or more, or at least one of the condenser fans, in an illustrative embodiment, and the condenser 213 may be inactivated by inactivating the condenser fans. Evaporator 215 may include an evaporator coil with one or more associated evaporator fans. Evaporator 215 may be activated by activating one or more, or at least one of the evaporator fans, in an illustrative embodiment, and the evaporator 215 may be inactivated by inactivating the evaporator fans.

Controller 203 may have various refrigeration settings for operating refrigeration unit 201 in different refrigeration control modes. For example, controller 203 may include a first refrigeration setting or control mode that defines an energy efficiency mode, and a second refrigeration setting or control mode that defines a compensation mode, where these modes define different operating parameters for controlling the components of the refrigeration unit 201 to pursue different objectives. For example, the energy efficiency mode may be more energy-efficient than the compensation mode, while the compensation mode may maintain the refrigeration unit within a tighter temperature range than the energy efficiency mode, in an illustrative embodiment. In particular, the first refrigeration setting has a first average power consumption and a first range of temperature variation, and the second refrigeration setting has a second average power consumption and a second range of temperature variation, such that the first average power consumption is lower than the second average power consumption, and the second range of temperature variation is smaller than the first range of temperature variation.

Controller 203 may illustratively be configured to operate the refrigeration unit alternately in the energy efficiency mode and the compensation mode. In particular, controller 203 may store instructions for both a first refrigeration setting for operating in a first refrigeration mode, e.g. the energy efficiency mode, and the second refrigeration setting for operating in a second refrigeration mode, e.g. the compensation mode. Controller 203 may also be configured for tracking the cumulative average temperature in a refrigeration element, such as a refrigerated air supply 219, for example, and for activating either the first refrigeration setting or the second refrigeration setting, depending on conditions. In particular, the controller 203 may activate the first refrigeration setting while the cumulative average temperature is within a selected temperature range having a lower threshold and an upper threshold. For example, this selected temperature range may be a range of temperatures in which the cumulative average temperature may be correctable within a desired amount of time by switching to operating in the compensation mode. Once the cumulative average temperature is less than the lower threshold or greater than the upper threshold of the selected temperature range, the controller may activate the second refrigeration setting until the cumulative average temperature is within a narrower target temperature range, such as within upper and lower margins of error around a desired setpoint temperature for the cumulative average temperature for a selected total period of time, in an illustrative embodiment. The target temperature range may therefore have a lower threshold that is greater than the lower threshold of the selected temperature range and an upper threshold that is less than the upper threshold of the selected temperature range, in this illustrative embodiment.

Controller 203 may also include a cumulative average temperature tracker or other means for tracking or monitoring a cumulative average temperature in the refrigeration element since beginning operating the refrigeration unit in the first refrigeration control mode. The refrigeration element may illustratively be a refrigerated air supply 219 leading from the evaporator 215 to the refrigeration chamber 205. Controller 203 may also include a refrigeration setting controller for activating either the energy efficiency mode or the compensation mode, which may be controlled depending on changes in the cumulative average temperature in a refrigeration element, such as the refrigerated air supply, for example.

As shown in the illustrative example of method 100 in FIG. 1, the controller 203 for example may evaluate the cumulative average temperature as in step 101, and may evaluate whether the cumulative average temperature is outside a temperature correction threshold, as in step 103. If the cumulative average temperature remains within the temperature correction threshold, the refrigeration unit 201 may continue to be operated in the energy-efficient mode, as in step 105, while if the cumulative average temperature remains goes outside the temperature correction threshold, the refrigeration unit 201 may be switched to operating in the compensation mode, as in step 107. These steps and various aspects about them are explained further as follows.

Operating the refrigeration unit 201 in the energy efficiency mode may have the effect of causing the temperature in the refrigerated air supply to oscillate up and down around a setpoint temperature. This may cause the average temperature in the refrigerated air supply to be approximate to the setpoint temperature. However, factors of uncertainty may cause the average temperature in the refrigerated air supply to deviate slightly from the setpoint temperature. In some applications, it may be desired to track the cumulative average temperature in the refrigerated air supply (or other refrigeration element) and ensure that this cumulative average temperature is nearly equal to the setpoint temperature, or within a tightly constrained target range around the setpoint temperature. While the deviation of the average temperature from the setpoint temperature may be minor, this minor deviation may accumulate over time to result in substantial differences between the cumulative average temperature and the setpoint temperature.

Comparing the cumulative average temperature in the refrigerated air supply (or other refrigeration element) with the setpoint temperature, and switching to operating the refrigeration unit 201 in the compensation mode for an interval of time, enables the refrigeration unit 201 to bring the cumulative average temperature back to the setpoint temperature, or to a tightly constrained target range around the setpoint temperature. Operating in the compensation mode may require a higher rate of energy usage than operating in the energy efficiency mode, but operating in the complete cycle of energy efficiency mode plus compensation mode still provides significant energy savings over always operating in a standard mode, while also still maintaining the capability of ensuring that the cumulative average temperature may be matched to a tightly constrained target range around the setpoint temperature.

The temperature correction threshold may define both an upper and lower threshold on a correctable temperature range, which may be a range such that operating the refrigeration unit 201 in the compensation mode is able to bring the cumulative average temperature in the refrigeration element back to a tight target range around a setpoint temperature. The refrigeration unit 201 may be allowed to run in the energy efficiency mode until the cumulative average temperature reaches either an upper or lower temperature correction threshold, and once the cumulative average temperature reaches the threshold of the correctable temperature range, the refrigeration unit 201 may be switched to operating in the compensation mode, until the cumulative average temperature reaches a target temperature range. The target temperature range may be within the correctable temperature range, and may define a much tighter range generally in the middle of the correctable temperature range, for example.

While the refrigeration element may illustratively be a refrigerated air supply 219 leading from the evaporator 215 to the refrigeration chamber 205, as discussed above, the refrigeration element may also take the form of refrigeration chamber 205 itself, or an air return line 221 for air returning to the refrigeration unit from a refrigerated environment, for example, in various embodiments.

The energy efficiency mode may itself include alternating or cycling the refrigeration unit between two phases, a high-capacity phase and an inactive phase. Controller 203 may activate the high-capacity phase when an upper temperature threshold is detected in the refrigeration element, and controller 203 may activate the inactive phase when a lower temperature threshold is detected in the refrigeration element. These upper and lower temperature thresholds are thresholds for the operating temperature of the refrigeration element, and are distinct from the correction thresholds applicable to the cumulative average temperature.

Figure 3:
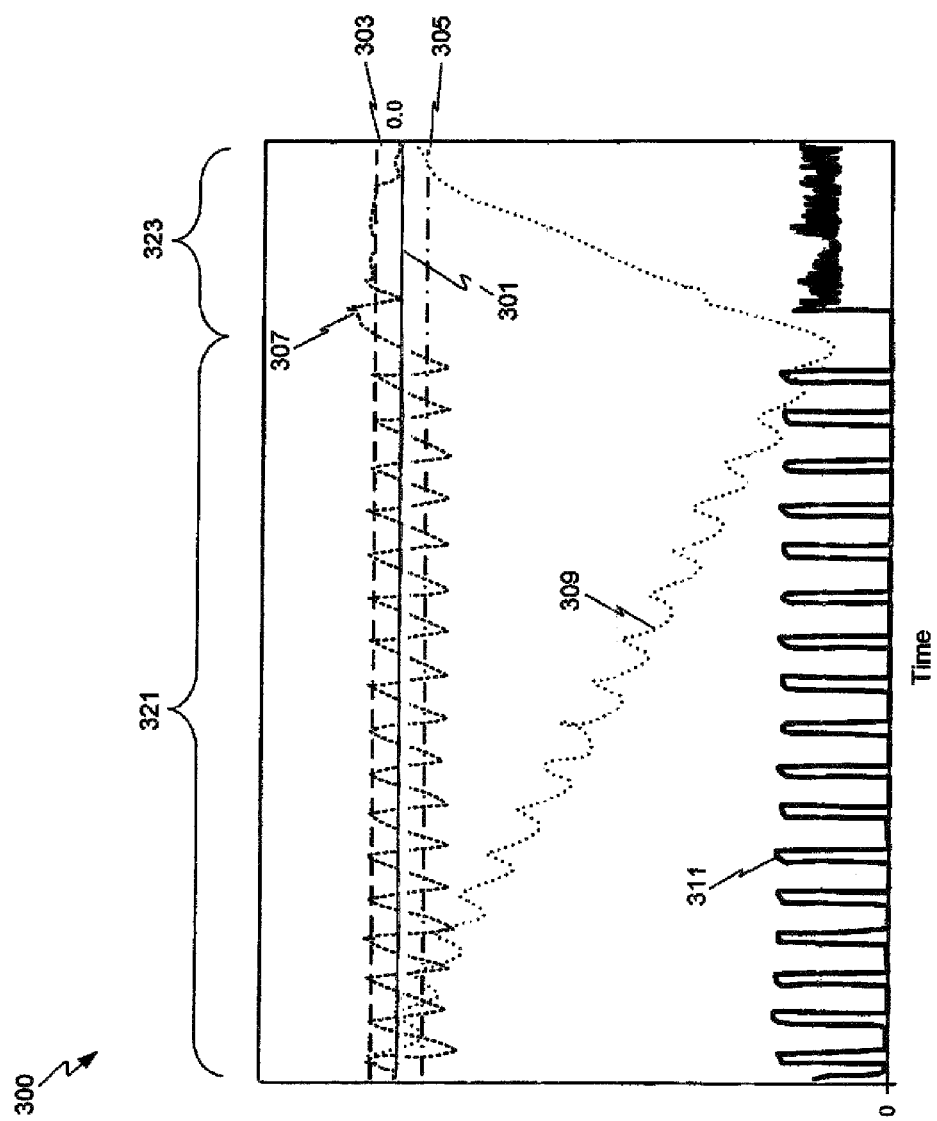
FIG. 3 depicts a graph showing data for various operating settings or modes and phases of a refrigeration control system and method according to one illustrative embodiment.

FIG. 3 illustrates these temperatures in relation to each other over time, in accordance with an illustrative implementation. Graph 300 shows setpoint temperature 301; upper operating threshold temperature 303 and lower operating threshold temperature 305 at margins above and below setpoint temperature 301; supply temperature 307, which is the actual operating temperature of the refrigerated air in a refrigeration element such as a refrigerated air supply 219; and cumulative average temperature 309, in accordance with this illustrative implementation. Graph 300 also shows the current 311 consumed by compressor 211 over time, indicative of power consumption by compressor 211 (with temperature measured in degrees Fahrenheit and current measured in amps, equal to power divided by voltage).

Graph 300 indicates operation of refrigeration unit 201 during a first mode or energy efficiency mode 321, operated in a first setting, and during a second mode or compensation mode 323, operated in a second setting. During energy efficiency mode 321, compressor 211 alternates between a high-capacity phase and an inactive phase. During the high-capacity phase, the condenser is activated, such as by activating the one or more condenser fans in the condenser, and the compressor is operated at close to a nominal full power, or at least 80% or so of its nominal full power, which in this illustrative implementation is approximately eight amps. With power equal to amps times voltage, for example in an illustrative implementation where the refrigeration unit 201 operates at 230 volts and activates the compressor at a nominal full power of eight amps, the refrigeration unit 201 would consume 1,840 watts during the high-capacity phase. In the inactive phase, the condenser and the compressor are both inactivated.

During the compensation mode 323, the condenser 213 is activated and the compressor 211 is operated at a lower average power than in the high-capacity phase of the first refrigeration setting, yet the compressor 211 is in constant operation and at a higher average power than in the energy efficiency mode 321 overall. As seen in graph 300, during the compensation mode 323, current 311 for the compressor 211 is typically less than its nominal full power but also generally remains at or above a lower threshold around approximately half its nominal full power, and varies within this range. The energy-efficiency mode 321 and the compensation mode 323 may together be activated for a selected total period of time for the operation of the first mode and then the second. For example, the compensation mode 323 may be activated for a correction interval of time, defined as an interval of time required for the second refrigeration setting, in which compensation mode 323 is activated, to bring the cumulative average temperature in the refrigeration element to the target temperature range. The controller may then control the refrigeration unit to operate in the first refrigeration setting, to operate in the energy-efficiency mode 321, for the selected total period of time minus the correction interval of time, and then to operate in the second refrigeration setting, operating in the compensation mode 323, for the correction interval of time.

As shown in the graph 300, the supply temperature 307 tends to overshoot the upper operating threshold temperature 303 and lower operating threshold temperature 305, in the illustrative implementation shown. However, in another illustrative embodiment, this overshoot may be mitigated or resolved with a different operating mode for operating the evaporator 215. The evaporator fan or fans of evaporator 215 may be activated during a majority of each of the high-capacity phases and inactive phases of the energy efficiency mode 321, but be inactivated an interval of time prior to the end of each high-capacity phase and inactive phase. This pre-emptive cut-off of the evaporator 215, prior to the end of each phase, enables the trajectory of the temperature change or rate of change of the temperature to be moderated or slowed as the temperature approaches both the upper operating threshold temperature 303 and the lower operating threshold temperature 305. This change in operation of the evaporator 215 may enable the temperature to approach each of the operating threshold temperatures more slowly, and may mitigate or prevent overshoot of the operating temperature of the refrigeration element above the upper operating threshold temperature 303 or below the lower operating threshold temperature 305, in this illustrative embodiment.

The evaporator fan or fans of evaporator 215 may also be operated at a high power during the majority of the high-capacity phase, such as from the beginning of the high capacity phase until a relatively short interval of time before the end of the high-capacity phase, and then operated at a relatively lower power during the majority of the inactive phase, such as from the beginning of the inactive phase until a relatively short interval of time before the end of the inactive phase. The evaporator fan or fans of evaporator 215 may also be operated at the high power level during the compensation mode. The relatively lower power at which evaporator 215 is operated during the majority of the inactive phase is a lower power than that at which evaporator 215 is operated during the high-capacity phase and the second refrigeration setting.

In an illustrative embodiment, a total period of time may be selected in which the refrigeration unit 201 is to spend in both the energy efficiency mode and then the compensation mode, in order to bring the cumulative average temperature up within the target temperature range, illustratively defined using upper and lower margins around a setpoint temperature, by the end of the total period of time. The correctable temperature range may be defined by a product of a rate, such as a maximum rate, at which the compensation mode or compensation refrigeration setting is capable of bringing the cumulative average temperature in the refrigeration element to the target temperature range, and a correction interval of time, which may be defined as an interval of time required for the compensation mode to bring the cumulative average temperature in the refrigeration element to the target temperature range. The controller 203 may then track the cumulative average temperature in comparison with the time remaining in the selected total period of time, and control the refrigeration unit to operate in the energy efficiency mode or setting for the selected total period of time minus the correction interval of time, and then switch to operating the refrigeration unit 201 in the compensation mode or setting for the correction interval of time.

Figure 4:
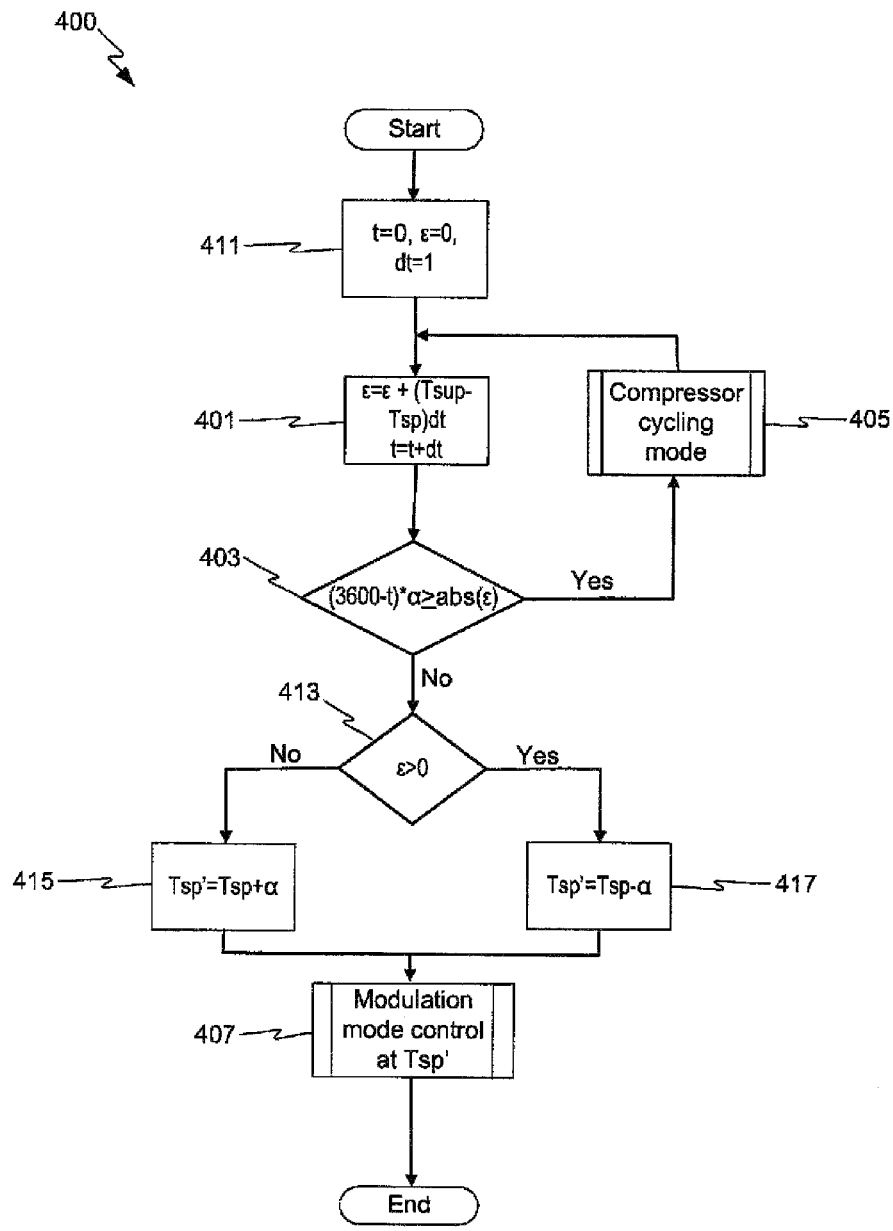
FIG. 4 depicts a flowchart for a method according to one illustrative embodiment.

This is illustratively depicted in the flowchart for illustrative method 400 in FIG. 4. Method 400 includes steps 401, 405, and 407, and decision node 403, which are analogous in some ways to steps 101, 105, and 107 and decision node 103 of method 100 of FIG. 1, in accordance with another of various illustrative embodiments. A total period of time of one hour, or 3,600 seconds, is illustratively selected.

Step 401 is preceded by step 411, of setting initial time t at zero, setting initial E at zero, and setting an evaluation time interval dt, which may illustratively be one second, for example, and where E represents the difference between the cumulative average temperature and the setpoint temperature. Step 401 is for evaluating the cumulative average temperature, in terms of updating E by the current difference between the supply temperature (or other refrigeration element temperature) and the setpoint temperature for the given interval of time.

Decision node 403 is for evaluating whether the cumulative average temperature is yet outside of a correction threshold, which in this embodiment is evaluated in terms of a correction capacity factor a, representing the capacity or rate of the compensation mode to bring the cumulative average temperature back toward the setpoint temperature. The correction capacity factor a is multiplied by the remaining interval of time within the selected total period of time, i.e. 3,600 seconds minus the current time t. The absolute value of E is used for this comparison, to evaluate the difference whether the cumulative average temperature is above or below the setpoint temperature. In other embodiments, different threshold temperatures may be used depending on whether the cumulative average temperature is running under or over the setpoint temperature, which may be used to reflect a difference in how quickly the compensation mode is able to return the cumulative average temperature back to a tight range around the setpoint temperature depending on whether it is running hotter or colder than the setpoint temperature, for example.

If the cumulative average temperature is still within the corrective capacity threshold, as determined in terms of correction capacity factor a and the time remaining in the selected total time interval, method 400 may go on to step 405, of continuing to operate the refrigeration unit in the compression cycling mode or energy efficiency mode. If the cumulative average temperature has exceeded the corrective capacity threshold, method 400 may go on to decision node 413, of determining whether the cumulative average temperature has crossed the upper or lower correction threshold. Depending on the result, method 400 may include either step 415 or 417, of setting a new, correction setpoint as the original setpoint temperature plus or minus the correction capacity factor a. Method 400 then proceeds to step 407, of switching operation of the refrigeration unit to the compensation or modulation mode, for the remainder of the selected period of time, during which the cumulative average temperature is brought back to the original setpoint temperature.

Figure 5:
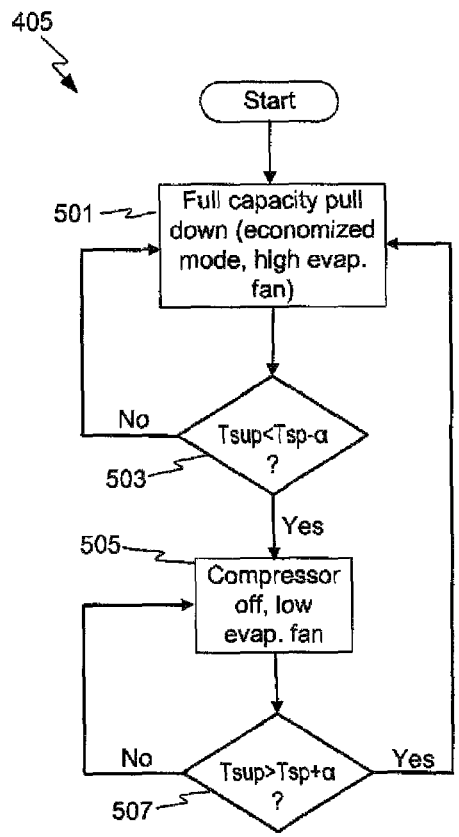
FIG. 5 depicts a flowchart for a method according to one illustrative embodiment.

FIG. 5 depicts a flowchart for method 405 for operating the refrigeration unit in the energy efficiency mode, involving cycling between the high-capacity phase and the inactive phase. Method 405 of FIG. 5 is an elaboration of step 405 of method 400 in FIG. 4. Step 501 represents operating in the high-capacity phase, with the compressor operating at or close to its nominal full power, such as at least 80% of its nominal full power, for example. The evaporator fan or fans may also be operated at a high power during this phase, but in one embodiment may be deactivated a relatively short interval of time prior to the end of this phase, to moderate the approach of the operating temperature toward its lower operating threshold, thereby mitigating or preventing overshoot. Decision node 503 involves evaluating whether the supply temperature is still above the setpoint temperature modified by a lower threshold margin (note, a is used differently in FIG. 5 than in FIG. 4). Once the supply temperature drops below the setpoint temperature modified by the threshold margin, the refrigeration unit is switched to step 505 of operating in the inactive phase. Decision node 507 represents evaluating whether the supply temperature is still below the setpoint temperature modified by an upper threshold margin. Once the upper margin is breached, the operation can return to step 501, of operating in the high-capacity phase; however, the entirety of method 405 may be pre-empted by the larger method 400 of FIG. 4, once the controller determines that the time is right to switch from the energy efficiency mode to the compensation mode.

Figure 6:
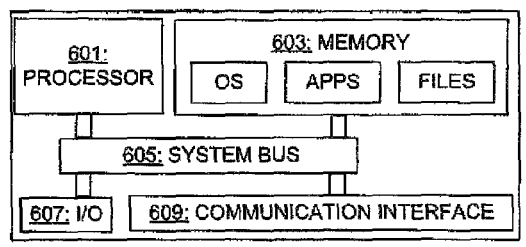
FIG. 6 depicts a schematic block diagram of a refrigeration controller according to one illustrative embodiment.

FIG. 6 depicts a schematic block diagram of a refrigeration controller 203 according to one illustrative embodiment of a control system or of a part thereof or of a controller that comprises a control system. Controller 203 includes at least one processor 601, at least one data storage or memory component 603, one or more input/output components 607, and one or more communication interfaces 609, interconnected such as by a system bus 605. The one or more data storage components 603 may have stored on them any of one or more operating systems, one or more applications, and one or more files, potentially among other elements. Input/output components 607 may include components involved in a user input interface, such as keys and a screen, for example. The one or more communication interfaces 609 may include one or more wireless communication components that may communicate with one or more input sensors, and one or more control relays, for example, where such input sensors and control relays are not explicitly depicted in FIG. 8 but may be housed within controller 203, refrigeration unit 201, or elsewhere in refrigeration system 200, for example. At least one algorithm may be stored on the at least one data storage component 603 to be executed by the at least one processor 601. The at least one algorithm may include executable instructions for one or more of the first refrigeration setting, the second refrigeration setting, the cumulative average temperature tracker, and the refrigeration setting controller, for example. A refrigeration control method as disclosed by any relevant embodiment may involve a method executed by the at least one processor 601 running executable instructions comprising at least one algorithm.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made, and equivalents that may be substituted for elements described with reference to the illustrative embodiments disclosed herein, without departing from the spirit and scope of the invention.

Therefore, it is intended that the present disclosure not be limited to the particular embodiment(s) disclosed as, but that the disclosure will include all embodiments falling within the scope of the appended claims.

We claim:

1. A controller for controlling a refrigeration unit, the controller configured for:
storing instructions for a first refrigeration setting having a first average power consumption and a first range of temperature variation;
storing instructions for a second refrigeration setting having a second average power consumption and a second range of temperature variation, wherein the first average power consumption is lower than the second average power consumption, and the second range of temperature variation is smaller than the first of temperature variation;
tracking a cumulative average temperature in a refrigeration element; and
activating either the first refrigeration setting or the second refrigeration setting, wherein the controller activates the first refrigeration setting while the cumulative average temperature is within a selected temperature range having a lower threshold and an upper threshold, and once the cumulative average temperature is less than the lower threshold or greater than the upper threshold of the selected temperature range, the controller activates the second refrigeration setting until the cumulative average temperature is within a target temperature range that has a second lower threshold that is greater than the lower threshold of the selected temperature range and a second upper threshold that is less than the upper threshold of the selected temperature range.

2. The controller of claim 1, wherein in the first refrigeration setting, the controller alternately activates a first phase and a second phase in the refrigeration unit, wherein the controller activates the first phase when an upper temperature threshold of the refrigeration element is detected, and the controller activates the second phase when a lower temperature threshold of the refrigeration element is detected.

3. The controller of claim 2, wherein the refrigeration unit comprises a compressor and a condenser comprising one or more condenser fans, and in the first phase, the one or more condenser fans are activated and the compressor is operated at at least 80% of a nominal full power, and in the second phase, the one or more condenser fans and the compressor are both inactivated.

4. The controller of claim 3, wherein in the second refrigeration setting, the one or more condenser fans are activated and the compressor is operated at a lower average power than in the first phase of the first refrigeration setting.

5. The controller of claim 2, wherein the refrigeration unit comprises one or more evaporator fans, the one or more evaporator fans are activated during a majority of each of the first phase and the second phase, and the one or more evaporator fans are inactivated an interval of time prior to the end of each of the first phase and the second phase.

6. The controller of claim 5, wherein the one or more evaporator fans are operated at a lower power during the second phase than during either the first phase or the second refrigeration setting.

7. The controller of claim 1, wherein the controller controls the refrigeration unit to operate in the first refrigeration setting and then in the second refrigeration setting for a selected total period of time, and the selected temperature range is defined by a product of a rate at which the second refrigeration setting is capable of bringing the cumulative average temperature in the refrigeration element to the target temperature range, and a connection interval of time, defined as an interval of time required for the second refrigeration setting to bring the cumulative average temperature in the refrigeration element to the target temperature range; and wherein the controller controls the refrigeration unit to operate in the first refrigeration setting for the selected total period of time minus the correction interval of time, and then is operated in the second refrigeration setting for the correction interval of time.

8. The controller of claim 1, wherein the target temperature range is defined using upper and lower margins around a setpoint temperature.

9. The controller of claim 1, wherein the controller comprises at least one processor, at least one data storage component configured for communication with said at least one processor, and at least one algorithm stored on the at least one data storage component to be executed by the at least one processor.

10. The controller of claim 9, wherein the at least one algorithm comprises executable instructions for one or more of the first refrigeration setting, the second refrigeration setting, the cumulative average temperature tracker, and the refrigeration setting controller.

11. The controller of claim 1, wherein the refrigeration element comprises at least one of: a refrigerated supply line provided from the refrigeration unit; a refrigerated environment that is refrigerated by the refrigeration unit; or an air return line for air returning to the refrigeration unit from a refrigerated environment.

12. A method comprising:
providing a first refrigeration control mode and a second refrigeration control mode for operating a refrigeration unit, wherein an average power consumption in the first refrigeration control mode is lower than an average power consumption in the second refrigeration control mode, and the second refrigeration control mode maintains the refrigeration unit within a smaller range of temperature variation than the first refrigeration control mode;
operating the refrigeration unit in the first refrigeration control mode;
monitoring a cumulative average temperature in the refrigeration element since beginning operating the refrigeration unit in the first refrigeration control mode; and
once the cumulative average temperature in the refrigeration element is outside a selected temperature range, switching to operating the refrigeration unit in the second refrigeration control mode, until the cumulative average temperature in the refrigeration element is within a target temperature range around a setpoint temperature, wherein the target temperature range has a second upper limit that is lower than an upper limit of the selected temperature range, and a second lower limit that is higher than a lower limit of the selected temperature range.

13. The method of claim 12, wherein in the first refrigeration control mode, the refrigeration unit is alternately activated in a first phase and a second phase, wherein the first phase is activated when an upper temperature threshold is detected in the refrigeration element, and the second phase is activated when a lower temperature threshold is detected in the refrigeration element; wherein in the first phase, one or more condenser fans are activated and a compressor is operated at at least 80% of a nominal full power, and in the second phase, the one or more condenser fans and the compressor are both inactivated; and wherein in the second refrigeration control mode, the one or more condenser fans are activated and the compressor is operated at a lower average power than in the first phase.

14. The method of claim 13, wherein at least one evaporator fan is activated during a majority of each of the first phase, the second phase, and the second refrigeration control mode, with the at least one evaporator fan operated at a lower power during the second phase than during either the first phase or the second refrigeration control mode, wherein the at least one evaporator fan is inactivated an interval of time prior to the end of each of the first phase, the second phase, and the second refrigeration control mode.

15. The method of claim 12, wherein the refrigeration unit is operated in the first refrigeration control mode and then in the second refrigeration control mode for a selected total period of time, and the selected temperature range is defined by a product of a rate at which the second refrigeration control mode is capable of bringing the cumulative average temperature in the refrigeration element to the target temperature range, and a correction interval of time defined as an interval of time required for the second refrigeration control mode to bring the cumulative average temperature in the refrigeration element to the target temperature range; and wherein the refrigeration unit is operated in the first refrigeration control mode for the selected total period of time minus the correction interval of time, and then is operated in the second refrigeration control mode for the correction interval of time.

16. The method of claim 12, wherein the method is executed by at least one processor running executable instructions comprising at least one algorithm.

17. The method of claim 12, wherein the refrigeration element comprises at least one of: a refrigerated supply line provided from the refrigeration unit; a refrigerated environment that is refrigerated by the refrigeration unit; or an air return line for air returning to the refrigeration unit from a refrigerated environment.

18. A refrigeration system comprising:
a refrigeration unit comprising a compressor, a condenser comprising one or more condenser fans, an expansion device, and an evaporator comprising one or more evaporator fans;
a refrigerated air supply leading from the evaporator to a refrigeration chamber; and
a controller with a communicative link to the compressor, the one or more condenser fans, the expansion device, and the one or more evaporator fans, wherein the controller is configured to:
operate the refrigeration unit alternately in a first mode and a second mode, wherein the first mode has a lower average power consumption than the second mode, and the second mode maintains the refrigeration unit within a smaller range of temperature variation than the first mode;
track a cumulative average temperature in the refrigerated air supply; and
once the cumulative average temperature is outside a selected temperature range, switches the refrigeration unit from operating in the first mode to the second mode until the cumulative average temperature is within a target temperature range around a setpoint temperature, wherein the target temperature range has a second upper limit that is lower than an upper limit of the selected temperature range, and a second lower limit that is higher than a lower limit of the selected temperature range.

19. The refrigeration system of claim 18, wherein in the first mode, the refrigeration unit is alternately activated in a first phase and a second phase, wherein the first phase is activated when an upper temperature threshold is detected in the refrigerated air supply, and the second phase is activated when a lower temperature threshold is detected in the refrigerated air supply;
wherein in the first phase, the one or more condenser fans are activated and the compressor is operated at at least 80% of a nominal full power, and in the second phase, the one or more condenser fans and the compressor are both inactivated; and
wherein in the second refrigeration control mode, the one or more condenser fans are activated and the compressor is operated at a lower average power than in the first phase.

20. The refrigeration system of claim 19, wherein the one or more evaporator fans are activated during a majority of each of the first phase, the second phase, and the second refrigeration control mode, with the one or more evaporator fans operated at a lower power during the second phase than during the first phase and the second refrigeration control mode, and the one or more evaporator fans are inactivated an interval of time prior to the end of each of the first phase, the second phase, and the second refrigeration control mode.

21. A controller for controlling a refrigeration unit comprising an evaporator having at least one evaporator fan, the controller configured for alternately activating a first phase and a second phase in the refrigeration unit, wherein the controller activates the first phase when an upper temperature threshold is detected in the refrigeration element, and the controller activates the second phase when a lower temperature threshold is detected in the refrigeration element, wherein the at least one evaporator fan is activated during a majority of each of the first phase and the second phase, and the at least one evaporator fan is inactivated an interval of time prior to the end of each of the first phase and the second phase;
wherein the first phase and the second phase are comprised in a first refrigeration setting, the first refrigeration setting having a first average power consumption and a first range of temperature variation, and the controller is further configured for alternately activating the first refrigeration setting and a second refrigeration setting having a second average power consumption and a second range of temperature variation, wherein the first average power consumption is lower than the second average power consumption, and the second range of temperature variation is smaller than the first range of temperature variation.

22. The controller of claim 21, wherein the at least one evaporator fan is operated at a lower power during the second phase than during the first phase.

23. The controller of claim 21, wherein the refrigeration unit further comprises a compressor and a condenser comprising one or more condenser fans, and in the first phase, the one or more condenser fans are activated and the compressor is operated at at least 80% of a nominal full power, and in the second phase, the one or more condenser fans and the compressor are both inactivated.

24. The controller of claim 21, wherein the at least one evaporator fan is operated at a lower power during the second phase than during either the first phase or the second refrigeration setting.

25. The controller of claim 21, wherein the controller is further configured for tracking a cumulative average temperature in a refrigeration element, and activating the first refrigeration setting while the cumulative average temperature is within a selected temperature range having a lower threshold and an upper threshold, and once the cumulative average temperature is less than the lower threshold or greater than the upper threshold of the selected temperature range, the controller activates the second refrigeration setting until the cumulative average temperature is within a target temperature range that has a second lower threshold that is greater than the lower threshold of the selected temperature range and a second upper threshold that is less than the upper threshold of the selected temperature range.

\* \* \* \* \*